Sept. 20, 1932.  W. UHRIK  1,878,555
POULTRY FEEDER
Filed Sept. 25, 1931   2 Sheets-Sheet 1
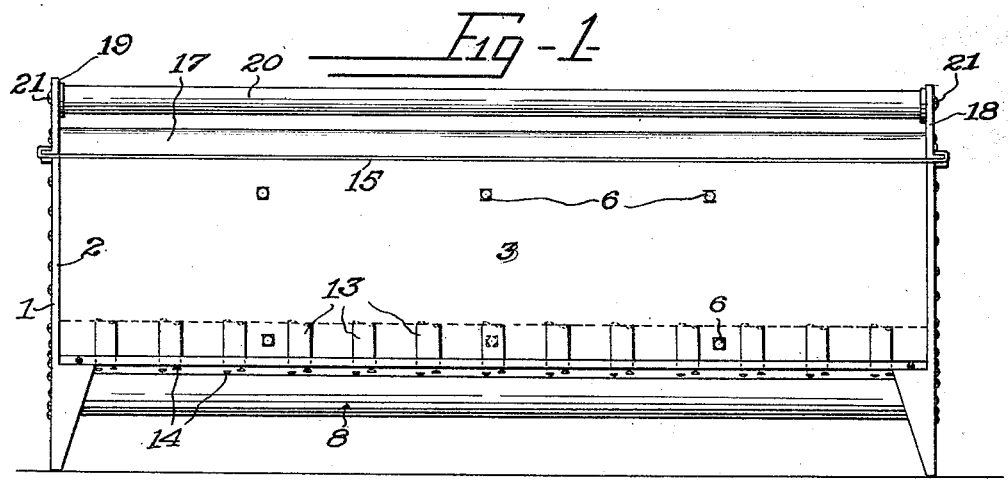
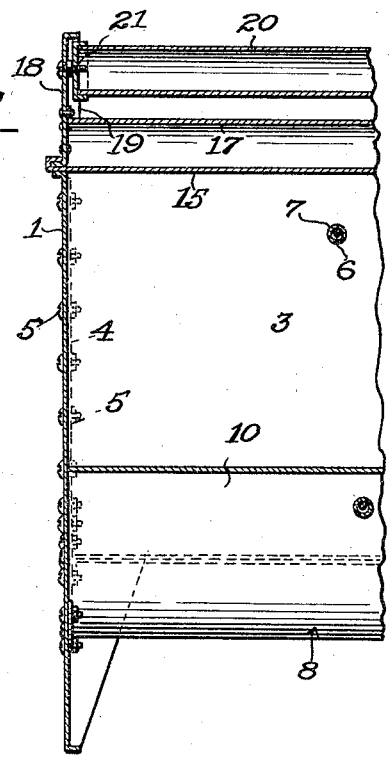
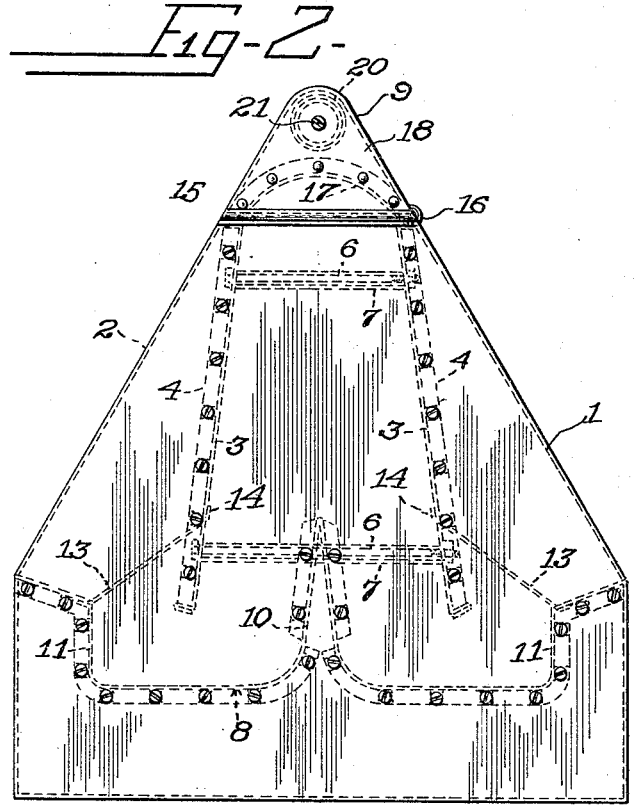
Willie Uhrik
INVENTOR
BY Victor J. Evans
and Co.
ATTORNEY
WITNESS: H. J. Meader Sept. 20, 1932. W. UHRIK 1,878,555
POULTRY FEEDER
Filed Sept. 25, 1931    2 Sheets-Sheet 2
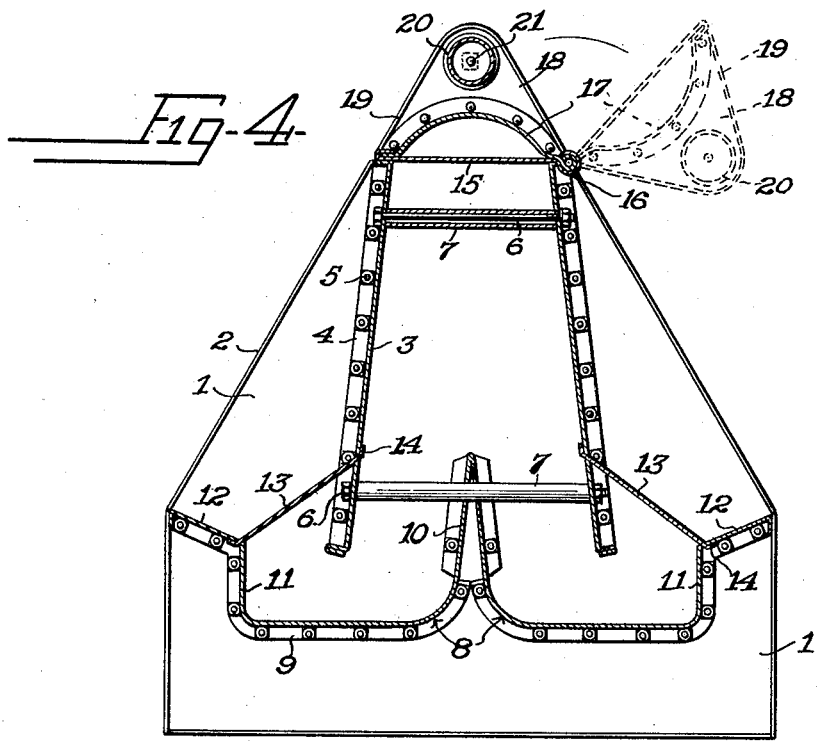
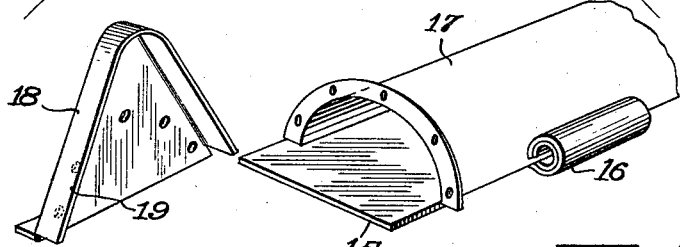
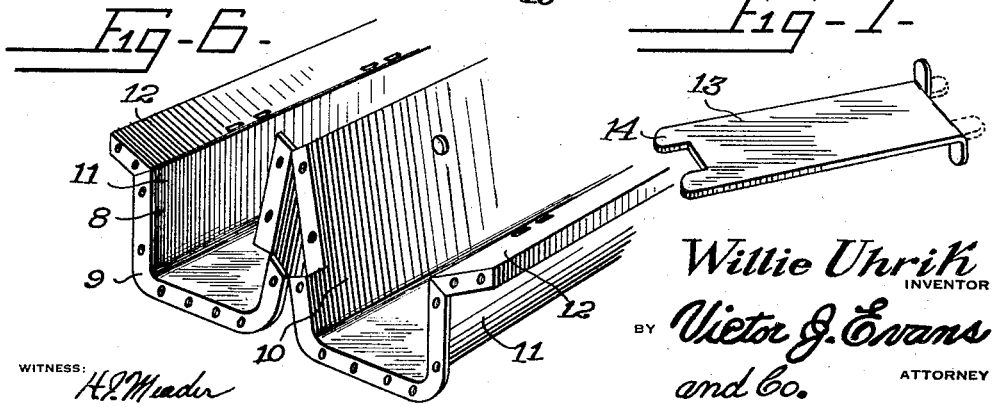

Patented Sept. 20, 1932

1,878,555

UNITED STATES PATENT OFFICE

WILLIE UHRIK, OF BELLVILLE, TEXAS

POULTRY FEEDER

Application filed September 25, 1931. Serial No. 565,177.

This invention relates to poultry feeders and it consists in the novel features hereinafter described and claimed.

An object of the invention is to provide a poultry feeder having a body portion with side walls spaced apart for a greater distance at their lower edges than at their upper edges, the bottom wall of the body having a V-shaped ridge extending between the lower edges of the side walls the arrangement being such that the feed which is placed within the body is prevented from packing within the body and may flow freely between the side walls to the bottom wall of the body. The bottom wall of the body is divided by the said ridge into troughs which have vertically disposed outer walls and synclined edge portions joining with the said vertical walls and adapted to direct any of the feed which falls from the bills of the fowls feeding from the troughs back into the troughs, thus preventing waste. Spaces are provided between the strips connected with the outer portions of the troughs and the side walls and through these spaces the fowls may pass their bills when partaking of the feed in the troughs.

A still further object of the invention is to provide a cover or lid for the body of such design as to effectually close the upper end of the body, the said cover having means which may serve as a handle and at the same time may function to prevent the fowls from perching or roosting upon the feeder.

In the accompanying drawings:—

Figure 1 is a side elevational view of the poultry feeder.

Figure 2 is an end elevation of the same.

Figure 3 is a fragmentary vertical sectional view of an end portion of poultry feeder.

Figure 4 is a transverse sectional view of the poultry feeder.

Figure 5 is a perspective view of part of the cover for the feeder.

Figure 6 is a perspective view of one end of the bottom wall of the body of the feeder.

Figure 7 is a perspective view of the spacing strip used upon the feeder.

As illustrated in the accompanying drawings the feeder consists of end pieces 1 of sheet metal, said pieces bound around their edges by angularly disposed strengthening flanges 2. Side pieces 3 also of sheet metal are provided at their ends with flanges 4 which are bolted or otherwise secured to the end pieces 2 as indicated at 5. The side pieces 3 are anticlined with relation to each other, that is to say the lower edges of the side pieces 3 are spaced from each other for a greater distance than at their upper edges. Bolts 6 pass transversely through the side pieces 3 and tubes 7 surround the intermediate portion of the bolts and have their ends in engagement with the inner surfaces of the side pieces 3 whereby the said side pieces 3 are braced in proper position with relation to each other.

A bottom wall piece 8 is provided at its ends with flanges 9 which are bolted or otherwise secured to the end pieces 1. The bottom piece 8 is preferably of sheet metal. The bottom piece 8 is provided along its medial line with anticlined portions 10 which forms a V-shaped ridge located midway between the lower portions of the side walls 3 and spaced therefrom. The ridge formed by the portions 10 divides the bottom wall into troughs and the lower portions of the side walls 3 enter said troughs and the lower edges of the side walls are spaced above the bottoms of the troughs. Each trough is provided with a vertical outer wall portion 11 and the said portions 11 extend into synclined edge portions 12. Spaced strips 13 have lugs 14 at their ends which pass through the lower portions of the side walls 3 and through the bottom wall 8 along the line while the edge portions 12 join with the vertical walls 11.

As shown in Figure 4 of the drawings the lower bolt 6 and the tube 7 thereon passes through the bottom wall portions 10. Thus the lower portions of the side walls 3 are effectually braced by the lower bolt and tube and the spaced strips 13. The fowls may pass their bills through the spaces between the strips 13 and partake of the feed which is deposited in the troughs formed within the bottom wall. Any of the feed which may drop from the bills of the fowls will fall upon the sloping edge portions 12 and roll back into the troughs. The feed is poured into the space between the side walls 3 and assumes a column therein and said column is divided or split by the anticlined portions 10 of the bottom wall 8 so that the feed will flow under the edges of both of the side walls 3 into the troughs of the bottom wall.

The cover for the body of the feeder hereinbefore described consists of a plate 15 which is provided at one edge with curls 16 which are hingedly connected with one of the side walls 3 and at the upper edge thereof. A convexed plate 17 is mounted upon the plate 15 and is adapted to serve as a roof or water shed when the plate 15 is closed over the space between the upper edges of the side walls 3. The ends of the plates 15 and 17 are secured to triangular end plates 18, the said end plates having angularly disposed flanges 19 which strengthen the same. A tubular handle 20 is secured by means of pivot bolts 21 to the end plates 18 and the said handle is spaced above the convexed plate 17. In the event that the fowls should attempt to perch or roost upon the handle the said handle will turn when the fowls alight thereon so that the fowls will lose their balance upon the handle and will jump or fly from the same.

Having described the invention what is claimed is:

1. A poultry feeder comprising end pieces, a bottom wall attached at its end edges to the end pieces and having anticlined intermediate portions dividing the bottom wall into parallel troughs the outer sides of which are vertical and the bottom wall having synclined edge portions which join with the vertical sides of the troughs, and side wall pieces located between the end pieces, said side wall pieces being spaced from and substantially parallel with the anticlined portions of the bottom wall.

2. A poultry feeder comprising end pieces, a bottom wall attached at its end edges to the end pieces and having anticlined intermediate portions dividing the bottom wall into parallel troughs, the outer sides of which are vertical and the bottom wall having synclined edge portions which join with the vertical sides of the troughs, side wall pieces located between the end pieces, said side wall pieces being spaced from and substantially parallel with the anticlined portions of the bottom wall and spaced strips attached to the side wall pieces and the vertical sides of the troughs.

In testimony whereof I affix my signature.

WILLIE UHRIK.